US012718168B1

(12) United States Patent
Sehgal et al.

(10) Patent No.: US 12,718,168 B1
(45) Date of Patent: Aug. 25, 2026

(54) MANAGING DEVELOPMENT AND PERFORMANCE IN A COMPUTING ENVIRONMENT USING MACHINE LEARNING

(71) Applicant: Morgan Stanley Services Group Inc., New York, NY (US)

(72) Inventors: Jaya Sehgal, Jersey City, NJ (US); Rita Chaturvedi, Edison, NJ (US); Samer Abraham, Paramus, NJ (US); Pallav Pant, Jersey City, NJ (US); Mainak Saha, Charlotte, NC (US); Corey Matthew Fuchsloch, East Windsor, NJ (US); Sadaf Daud, Livingston, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/231,314

(22) Filed: Jun. 6, 2025

(51) Int. Cl.
*G06Q 10/0635* (2023.01)

(52) U.S. Cl.
CPC ................................ *G06Q 10/0635* (2013.01)

(58) Field of Classification Search
CPC .................................................. G06Q 10/0635
USPC ........................................................ 705/7.28
See application file for complete search history.

(56) References Cited

U.S. PATENT DOCUMENTS 10,747,651 B1 8/2020 Vanderwall et al.
10,977,155 B1 * 4/2021 Muras ................. G06F 11/3608
11,113,175 B1 9/2021 Adamo et al.
11,853,415 B1 * 12/2023 Wainer ..................... G06N 7/01
12,020,025 B1 * 6/2024 Zhang ..................... G06F 8/433
2022/0147839 A1 * 5/2022 Macedo ................ G06F 16/287
2022/0172141 A1 * 6/2022 Mayrhofer ....... G06Q 10/06315
2023/0084685 A1 * 3/2023 Tamilselvam ............ G06F 8/72 717/123
2023/0289202 A1 * 9/2023 Subramanian ........ G06F 9/3005
2024/0028327 A1 * 1/2024 Deshpande ............... G06F 8/77
2024/0078101 A1 * 3/2024 Hykes ....................... G06F 8/60
2024/0220505 A1 7/2024 Shashi et al.
2024/0220899 A1 7/2024 Webb et al.
2024/0320106 A1 * 9/2024 Waplington ........ G06F 11/1469
2024/0330765 A1 * 10/2024 Oliveira ................. G06N 20/00
2024/0338457 A1 10/2024 Krishnan (Continued)

*Primary Examiner* — Abdallah A El-Hage Hassan
(74) *Attorney, Agent, or Firm* — Duane Morris LLP

(57) ABSTRACT

A system for managing development and performance in a computing environment is disclosed. The system is programmed to receive change requests, evaluate the change requests as embeddings within a computing environment, which is modeled by an asset graph representing the computing assets in the computing environment and the relationships among the computing assets. The system is programmed to then implement the change requests scheduled for a current release and continuously monitor the status of the computing environment. In response to an issue that arises, the system is programmed to determine relevant computing assets, including computer applications, and identify relevant change requests using the asset graph. The system is programmed to also compare logs of relevant computing assets as embeddings with the change requests to identify additional relevant change requests. The system is programmed to then implement remedial measures related to one of more identified change requests to address the issue.

19 Claims, 5 Drawing Sheets

(56) References Cited

U.S. PATENT DOCUMENTS

2024/0362208 A1 10/2024 Naufel
2025/0036939 A1 * 1/2025 Garapati .................. G06N 3/08

* cited by examiner

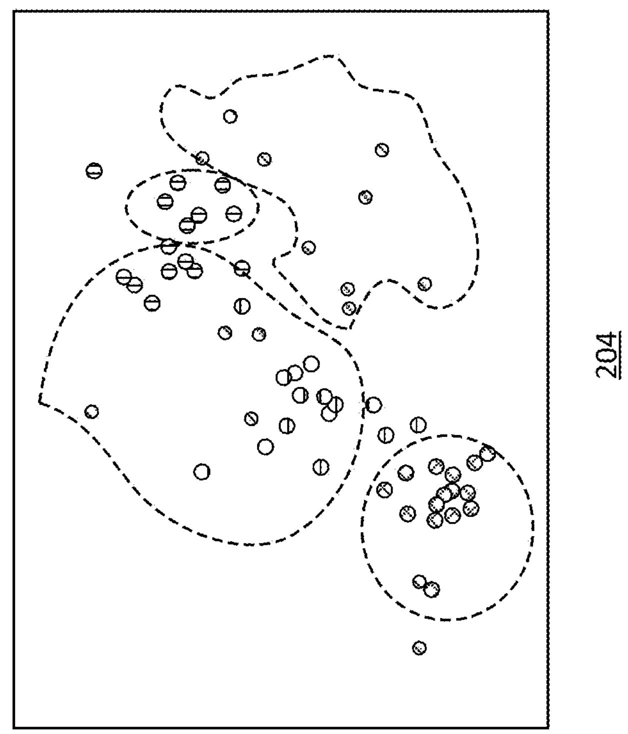
204
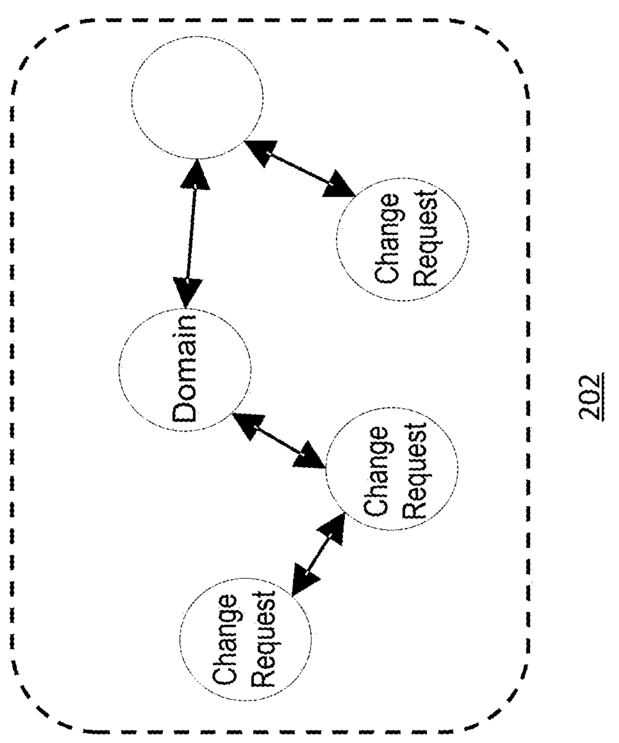
202
FIG. 2

| Systemic Risk 302 | System Health 304 | Error Budget 306 | Recommendation 308 |
|---|---|---|---|
| Good | Good | Good | Proceed with the Change |
| Good | Good | Bad | Trigger App group owner approval to proceed with change and create problem ticket |
| Good | Bad | Good | Trigger app group owner approval to certify the change is to improve System Health |
| Good | Bad | Bad | Trigger app group owner approval to certify the change is to improve System Health |
| Bad | Good | Good | Trigger App group owner approval for acceptance of Systemic Risk |
| Bad | Good | Bad | Trigger App group owner for acceptance of Systemic Risk and create a problem ticket for Error Budget improvement |
| Bad | Bad | Good | Trigger app group owner approval to certify the change is to improve System Health and also confirm acceptance of Systemic Risk |
| Bad | Bad | Bad | Change will most probably fail. Initiate awareness with Senior Management, Prod Support and Incident Management |

FIG. 3

MANAGING DEVELOPMENT AND PERFORMANCE IN A COMPUTING ENVIRONMENT USING MACHINE LEARNING

TECHNICAL FIELD

The present disclosure relates to managing development and performance in a computing environment, and more particularly to analyzing change requests using specific data structures and machine learning techniques.

BACKGROUND

In today's computing environment, a system is continuously built and updated, often controlled via change requests within a release and change management process. New change requests are submitted for new or corrective features of the system. Approved change requests are implemented in a release of the system. The performance of the system is monitored to enable identification of further new and corrective features.

Each change request can encompass a wealth of information, and many change requests can be flowing through the system at any given time. Therefore, it would be helpful to properly and efficiently evaluate the change requests and coordinate the implementation thereof with respect to the computing environment for improved system performance.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 2 illustrates examples models related to change requests.

FIG. 3 illustrates a recommendation engine that provides a recommendation based on three categories.

DETAILED DESCRIPTION OF CERTAIN EMBODIMENTS

Figure 1:
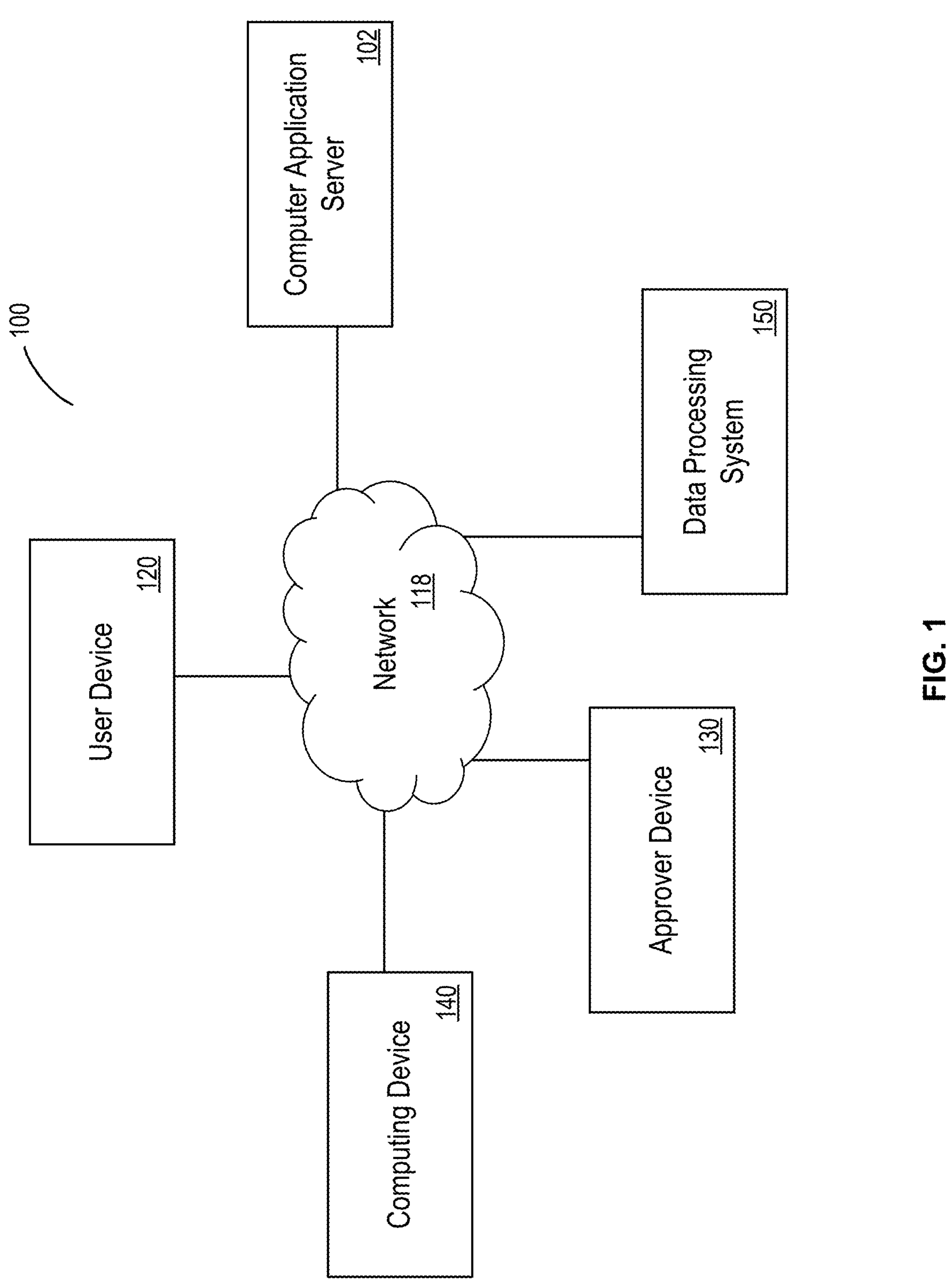
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. GENERAL OVERVIEW

A system and related methods for managing development and performance in a computing environment is disclosed. The system is programmed to receive change requests, evaluate the change requests as embeddings within a computing environment, which is modeled by an asset graph representing the computing assets in the computing environment and the relationships among the computing assets. The system is programmed to then implement the change requests scheduled for a current release and continuously monitor the status of the computing environment. In response to an issue that arises, the system is programmed to determine relevant computing assets, including computer applications, and identify relevant change requests using the asset graph. The system is programmed to also compare logs of relevant computing assets as embeddings with the change requests to identify additional relevant change requests. The system is programmed to then implement remedial measures related to one of more identified change requests to address the issue.

In some embodiments, the system is programmed to receive change requests for new or updated features of one or more computing assets, such as a computer application, in a computing environment. The system is programmed to represent each change request as an embedding based on various features of the change request and assign the embedding to one of a set of clusters, where each cluster includes similar embeddings. In addition, the system is programmed to have the computing environment modeled by an asset graph, where each node represents a computing asset and each edge represents a relationship between two computing assets. For example, two nodes could represent two computer applications, and an edge connecting the two nodes could represent the relationship that one of the computer applications calls the other computer application. Since each change request applies to one or more computing assets, the asset graph captures certain relationships among the change requests.

In some embodiments, the system is programmed to determine when to implement a new change request subject to various timing constraints. The system is programmed to identifying timing constraints related to other change requests based on the asset graph and the set of clusters of change request embeddings. For example, avoiding frequently modifying the same computer application or concurrently updating related computing applications can reduce the chance of failure in the computing environment. The system can be programmed to identify additional timing constraints considering the specific nature of the change requests, such as avoiding updating trading application when the market is open. Furthermore, following the determination of when to implement one or more change requests, the system can be programmed to specifically assess the current state of the computing environment in terms of resource utilization, service level, or other factors, to lessen the risk of deteriorating performance from implementing the change requests.

In some embodiments, as change requests are implemented, the system is programmed to continuously monitor the status of the computing environment. In response to any issue that arises, the system is programmed to represent logs of relevant computing assets also as embeddings for further analysis based on various entries in the logs. The system can then trace the issue back to implemented change requests based on the asset graph, the set of clusters of change request embeddings, and the group of log embeddings. For example, logs that show errors can be used to identify relevant change requests, and relationships among computer applications can also help identify relevant change requests. The system is programmed to then apply appropriate measures, such as rolling back a specific change request, to resolve the issue.

The system disclosed herein has several technical benefits. By modeling change requests in different frameworks, the system captures rich attributes and relationships of the change requests and can thus perform more efficient and accurate analysis to improve a computing environment. As the computing environment today involves a large number of computing assets interconnected in complex ways, carefully scheduling and implementing the change requests would avoid potential conflicts among change requests that lead to failures of the computing assets. By further performing a risk analysis with respect to the current state of the computing environment before implementing change requests in a current release, the system would also avoid hitting performance bottlenecks given existing workloads. Furthermore, strategically diagnosing any issues that do arise by rolling back existing change requests, submitting new ones, or otherwise adjusting configurations of the computing assets would help reduce the downtime in the computing environment.

2. EXAMPLE COMPUTING ENVIRONMENTS

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, a networked computer system 100 comprises a computer application server ("server") 102, a user device 120, an approver device 130, a computing device 140, and a data processing system 150, which are communicatively coupled through direct physical connections or via a network 118.

In some embodiments, the user device 120 is programmed or configured to submit a change request for implementing one or more new or updated features of a computing asset, such as a computer application, in a distributed computing environment, which can coincide with the networked computer system or exclude the data processing system 150. The user device 120 or another user device can also be programmed to submit requested changes or related data, such as test cases or validation criteria. In addition, the user device 120 or another user device can be programmed to request executing the one or more features, receive data produced from executing the one or more features, or report an issue in communicating with the computing device 140. The user device 120 node can comprise a personal computing device, such as a desktop computer, laptop computer, or tablet computer.

In some embodiments, the computing device 140 is programmed or configured to host or execute a computing asset. The computing device 140 can be programmed to receive input data for executing the computing asset and transmitting output data from executing the computing asset. The computing device 140 can comprise any centralized or distributed computing facility with sufficient computing power in data processing, data storage, and network communication for performing the above-mentioned functions.

In some embodiments, the data processing system 150 is programmed or configured to process data using large language models (LLMs) capable of various tasks, such as reasoning, inference, and conversing tasks. The data processing system 150 can comprise any centralized or distributed computing facility with sufficient computing power in data processing, data storage, and network communication for performing the above-mentioned functions.

In some embodiments, the server 102 is programmed or configured to evaluate change requests, assess their risks, schedule their implementation, and track them down and analyze them to resolve system issues. The server 102 can comprise any centralized or distributed computing facility with sufficient computing power in data processing, data storage, and network communication for performing the above-mentioned functions. In certain embodiments, the computing device 140 or the data processing system can be incorporated into the server 102.

In some embodiments, the approver device 130 is programmed or configured to provide approvals of various aspects of change requests, such as scheduling, testing, implementation, validation, or rollback. The approver device 130 can also comprise a personal computing device, such as a desktop computer, laptop computer, or tablet computer.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link.

In some embodiments, the server 102 is programmed to receive a change request from the user device 120 for implementing a feature of a computer application. The server 102 is programmed to then evaluate the change request against different type of data in a data store to determine in which release to implement the change request. Specifically, the server 102 can be programmed to communicate with the data processing system 150 to obtain a determination from executing one or more LLMs. The server 102 can be programmed to communicate with the computing device 140 or other computing devices regarding testing the feature, implementing the feature in a new release, and validating the feature. The server 102 can also be programmed to obtain an approval from the approver device 130 related to the implementation of the feature. Furthermore, the server 102 is programmed to monitor the status of the distributed computing environment. The server 102 can be programmed to receive a report regarding a system issue from a user device or automatically detect the system issue, identify the feature as causing the issue, and obtain an approval from the approver device 130 to rollback the feature.

3. FUNCTIONAL DESCRIPTIONS

3.1. Processing Change Requests to Update Computer Systems

FIG. 2 illustrates examples models related to change requests. In some embodiments, the server 102 is programmed to obtain system information related to a computer system having various computing assets, including computer devices, computer applications, or digital data. The server is programmed to then build and store an asset graph based on the system information, such as the asset graph 202, where each node represents a computing asset and each edge represents a relationship between two computing assets. For example, an edge can represent the relationship that a first computer application calls a second computer application, is built on top of and thus dependent on a second application, shares a library with a second computer application, or requires the output of a second computer application. Each node can have one or more attributes. For example, a node that represents a computer application can have attributes that correspond to the size, computing platform, computing function, business purpose, access control, or another aspect of the computer application. Each edge can also have one or more attribute, such as one that specifies the relationship type or another one that specifies a weight indicating the strength or significance of the relationship.

In some embodiments, the server 102 is programmed to receive a change request to update the computer system. The change request can be for adding a new feature to a computer application or adjusting a setting of a computer device. The change request can include various components. Specifically, the change request can include a summary of the change or a description of scope (e.g., number of lines of code or applicable computer applications), purpose (e.g., for tax computation or for improving marketing efficiency), or impact (e.g., consequence of failure, number of downstream features) in natural language, in terms of predefined descriptors, or using another format. The change request can also include information for a forward procedure to implement the change, for a validation procedure to test the implementation, or for a backward procedure to roll back the implementation. Such information can refer to functional calls or include programming code. Furthermore, the change request can include a desired time for production release. The server 102 can be programmed to extract or derive additional attributes of the change request from the components of the change request discussed above.

In some embodiments, the server 102 is programmed to extract asset information from each change request and link the change request to the asset information or incorporate the linking information into the asset graph, to facilitate cross reference between change requests and computing assets. The asset information concerns each computing asset to which the change request applies. The server 102 can be programmed to create an index that maps a change request to the set of computing assets covered by the change request. The server 102 can also be programmed to add or update an attribute of each node that represents a computing asset covered by a change request to specify the charge request. Similarly, in addition or instead, the server 102 can be programmed to expand the asset graph into a general graph where a node can additionally represent a change request and an edge can additionally represent the relationship that a change request applies to a computing asset.

In some embodiments, the server 102 is programmed to generate an embedding for each change request for compact storage and easy comparison. The embedding can be generated using any known machine learning techniques, such as an autoencoder, and stored in a database. The server 102 can be further programmed to assign embeddings into a set of clusters using any known clustering techniques, such as density-based spatial clustering of applications with noise (DBSCAN). In the set of clusters 204 in FIG. 2, the circles represent the embeddings, which are plotted in specific locations according to their values and which physically form clusters, where the patterns within the circles represent cluster characteristics. The server 102 can also be programmed to identify or build a cluster representative using known techniques, such as computing a centroid, or reassign embeddings to rebalance the clusters from time to time. The clustering information can also be stored in a database. Embeddings in the same cluster then generally correspond to change requests that are semantically similar based on similarity in one or more components of a change request.

3.2. Evaluating Change Requests for Production Release 3.2.1. Scheduling Change Requests In some embodiments, the server 102 is programmed to determine whether a change request is to be scheduled for a release into the production environment. The server 102 can be programmed to further determine what the release date or time is to be. The server 102 can be programmed to consider existing schedules and resulting timing constraints related to other change requests or additional relevant events, such as events related to resource utilization of the computer system, internal business operations, or environmental conditions. The server 102 can be programmed to assign priorities to different timing constraints or different change requests. The server 102 can be programmed to then determine how to apply the different timing constraints based on the timing constraint priorities, identify potential conflicts that might arise from under applicable timing constraints, and determine how to schedule the change requests to avoid the conflicts based on the change request priorities. The available time slots can be expressed as different release periods, different periods within a day, or any combination of time periods at different granularities.

In some embodiments, the timing constraints related to other change requests can include a first type of not scheduling more than a certain number of change requests that apply to the same computing asset or are similar in other aspects, in the same release or within a certain period of time, or a second type of not scheduling change requests for computing assets that are related in some way. For example, for the first type, having multiple features added to the same computer application at once might increase the chance of breaking the application, while for the second type, having a first feature added to a first computer application and a second feature added to a second computer application that depends on the first application might increase the chance of the second feature failing since the first feature could fail. For the first type, the server 102 can be programmed to identify change requests that have embeddings that belong to the same cluster or are less than a certain distance away. For the second type, the server 102 can be programmed to identify change requests that apply to computing assets represented by nodes connected by a path that satisfies one or more criteria in the asset graph, such as including an edge that represents a dependency relationship or having a length smaller than a certain threshold.

In some embodiments, the timing constraints related to additional events can include not scheduling a change request based on the attributes of the change request and schedules associated with system resource utilization, internal business operations, or environmental conditions. In terms of system resource utilization, scheduling can be prohibited when system resource utilization exceeds a certain threshold, especially when the testing, implementation, or validation of the change request requires significant resources, for instance. In terms of internal business operations, scheduling can be prohibited when specific teams are unavailable, especially when the testing, implementation, or validation of the change request requires the attention of those teams, for instance. In terms of environmental conditions, scheduling can be prohibited during specific periods or hours associated with specific activities, especially when the testing, implementation, or validation of change request interferes with the specific activities, for instance, such as the trading hours, a volatile market period (e.g., market behavior aggregate delta >X % in last Y business days), or the tax season. In other embodiments, additional timing constraints can require that certain change requests be scheduled for the same time periods instead. It is to be understood that a timing constraint can impose any kind of timing requirements on scheduling.

In some embodiments, the server 102 is programmed to determine whether a change request is to be scheduled for a release into the production environment and if so what the release date or time is to be, using various machine learning or other computational approaches. The server 102 can be programmed to perform such determination for a group of change requests one change request at a time or all at once. In a rule-based approach, the timing of the change requests can be set up as variables, the timing constraints can be set up as rules, compliance with the rules (e.g., true for one and false for zero) can be set up as an objective function that is to be maximized, and the priorities for the timing constraints or change requests can be set up as weights in the objective function. The server 102 can then be programmed to solve a linear programming problem using known techniques. In an alternative approach, the server 102 can be programmed to obtain a prompt that instructs an LLM to find the best timing for the change requests given all the timing constraints and provide an explanation for the finding based on linguistic analysis.

3.2.2. Assessing System Risk

In some embodiments, the server 102 is programmed next to assess a system risk for scheduling one or more change requests, specifically to analyze the risk caused by scheduling the change requests and provide recommendation on how the risk can be reduced. The server 102 can be programmed to consider different, possibly related categories of risk indicators. A first example category is the system health, which directly measures the utilization of individual system resources and can include as risk indicators the status of available disk space, processor cycles, or other computing resources within a certain period of time. A second example category is the error budget, which indicates whether the computer system has enough resources to handle the testing, implementation, or validation of new features and can include as risk indicators an aggregate response time, error rate, or other service level indicators over all requests received within a certain period of time. A third example category is the systemic risk assessment, which indicates the expected workload associated with the change requests in terms of running tasks or resolving issues and can include as risk indicators various failure factors, such as the number of covered features or corresponding tasks, number of source code pull requests, deployment rates, or number of emergencies in prior incident records within a certain period of time. The values of these failure factors can be obtained from data associated with prior change requests that are considered similar to the currently scheduled change requests based on the corresponding embeddings. A fourth example category is the system topology health, which indicates the system infrastructural health and can include as risk indicators the status of networks, load balancers, routers, switches, nodes, or other infrastructure components within a certain period of time.

In some embodiments, the server 102 is programmed to assess the system risk by aggregating the values of the risk indicators in various ways. For example, an aggregate risk value can be computed for each category, and a system risk value can be taken as a weighted average of the aggregate risk values over all the categories. Different system risk values can be associated with different recommended actions. FIG. 3 illustrates a recommendation engine that provides a recommendation based on three categories. The columns 302, 304, and 306 correspond to three of the categories discussed above, and the column 308 includes the corresponding recommendation for handling the change requests. Each of the columns 302, 304, and 306 includes a value of good or bad that could depend on whether the aggregate risk value for the category exceeds a predetermined threshold for the category. In other embodiments, all the risk factors can be used as features to train a machine learning model, such as a feedforward neural network, that generates a system risk, where different values of the system risk can then be associated with different recommended actions.

In some embodiments, the server 102 is programmed to perform an iterative process of change request scheduling and system risk assessment until a final approval of scheduling specific change requests for a release is obtained. The server 102 can be programmed to then incorporate the features in the change requests into the production environment under proper deployment procedures.

3.3. Diagnosing and Resolving System Issues

In some embodiments, the server 102 is programmed to continuously monitor the system status and identify system issues based on various performance and reliability metrics. For example, these metrics can correspond to the risk factors in the system health, error budget, or system topology category noted above. These metrics can also correspond to direct errors or warnings produced by computing assets or reported by users. A system issue can arise when a combination of these metrics have below-threshold values in predetermined ways or based on the output of a machine learning model trained to assess the probability of a system failure based on the performance and reliability metrics. The server 102 is programmed then to find a root cause of the system issue in terms of one or more implemented change requests.

In some embodiments, the server 102 is programmed to identify one or more computing assets relevant to a system issue from the description of the system issue or the log file of each computing asset. For example, a user report of a user interface problem can typically be directly linked to at least one computing asset, and errors, warnings, or other performance abnormalities of a computer asset would typically be captured in the log file of the computing asset. The server 102 is programmed to then traverse the asset graph to identify the change requests linked to the relevant computing assets and to the related computing assets, as discussed above. For example, each node representing a relevant computing asset and all nodes representing other computing assets reachable from that node by fewer than a certain number (K) of edges (namely in the K-neighborhood or a ball of radius K) can be determined, and their attributes corresponding to change requests or additional nodes connected to all those nodes and representing change requests can be identified.

In some embodiments, the server 102 is programmed to segment or combine logs to obtain an appropriate log set, such as a combination of logs corresponding to a certain period right before the system issue is identified. The logs can come from the relevant computing assets, from those plus their related computing assets, or all the computing assets, for instance. The server 102 can be programmed to then generate an embedding for the log set or additionally the description of the system issue. The server 102 can be programmed to match the log set with those implemented change requests to identify the change requests that are similar to the log set, such as by first comparing the log set with each cluster representative and then computing the distance between the log set and each cluster member based on corresponding embeddings.

In some embodiments, the server 102 can be programmed to further process the set of change requests from traversing the asset graph and the set of change requests from analyzing the log embeddings to obtain an enhanced set of change requests. For example, the enhanced set can be the union or intersections of the two sets, can include all the change requests in a first of the two sets and all the change requests in the second set that are sufficiently close to the first set, or can include a subset of the change requests in the two sets that are closest to one another (based on the embeddings). The server 102 is programmed to then obtain an evaluation of each change request in the enhanced set in terms of its relationship with the system issue and determine next steps. Possible next steps to implement for each identified change request with an evaluation that satisfies predetermined conditions include invoking the corresponding rollback procedure, submitting another change request to fix this change request, or reset, rerun, or reboot a computing asset covered by the change request. The server 102 can be further programmed to perform the determined next steps to remedy the system issue.

4. EXAMPLE PROCESSES

Figure 4:
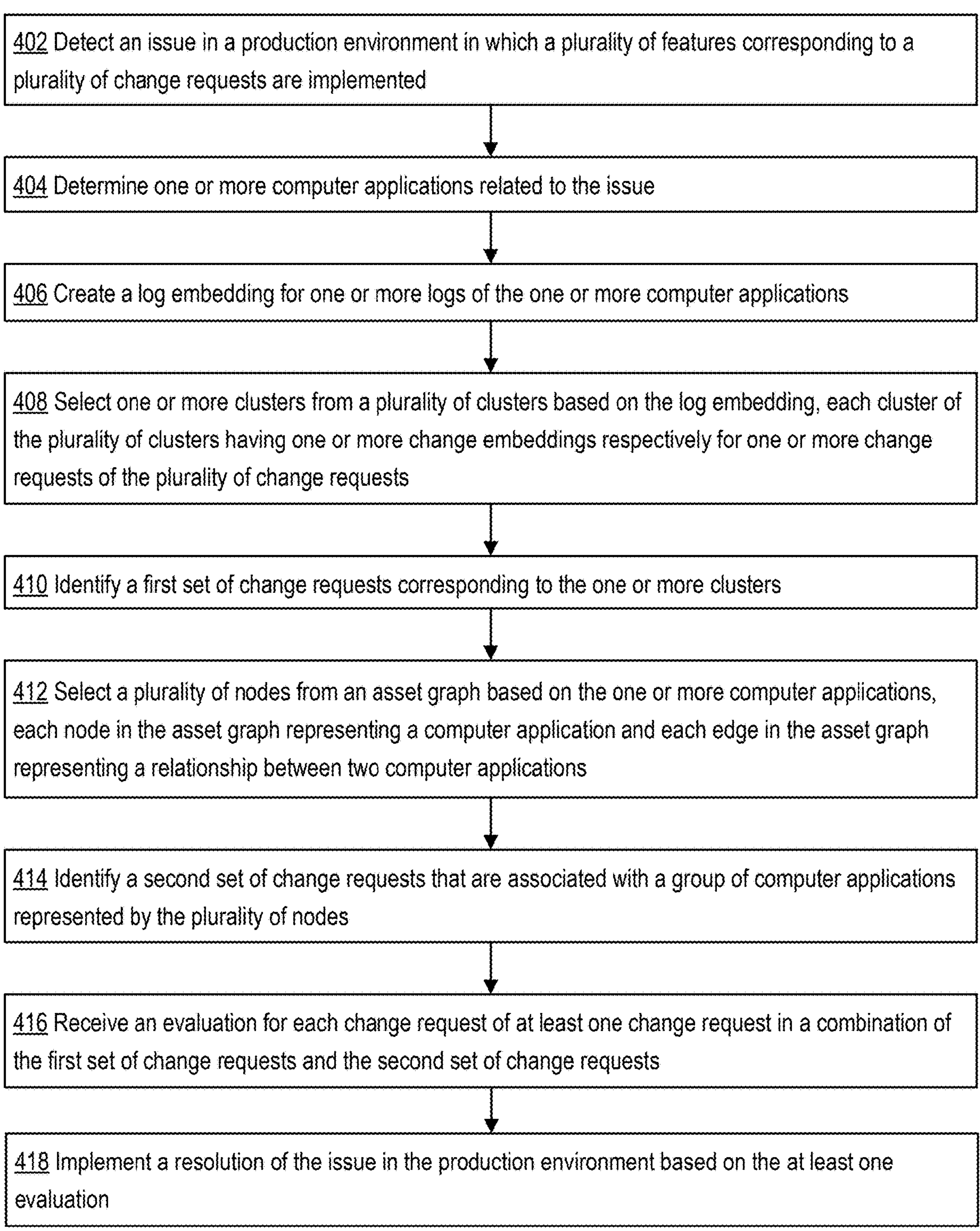
FIG. 4 illustrates a process of managing development and performance in a computing environment in accordance with disclosed embodiments.

FIG. 4 illustrates a process of managing development and performance in a computing environment in accordance with disclosed embodiments. FIG. 4 is shown in simplified, schematic format for purposes of illustrating a clear example and other embodiments may include more, fewer, or different elements connected in various manners. FIG. 4 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, the server 102 is programmed to receive a change request and create a change embedding for the change request. The server 102 is further programmed to assign the change embedding to a cluster of the plurality of clusters and identify a specific computer application associated with the change request. In addition, the server 102 is programmed to determine a first set of timing constraints based on the cluster and a second set of timing constraints based on a neighborhood of the node representing the specific computer application in the asset graph. Moreover, the server 102 is programmed to determine a schedule for implementing the change request using a LLM based on the first set of timing constraints and the second set of timing constraints and implement one or more change requests scheduled for a current release in the production environment.

In some embodiments, the first set of timing constraints includes not scheduling more than a first number of change requests with embeddings that belong to the cluster for a common time period. The second set of timing constraints includes not scheduling more than a second number of change requests associated with computer applications represented by nodes in the neighborhood for the common time period.

In some embodiments, the server 102 is programmed to evaluate one or more attributes of the change request, including expected resource utilization, affected user accounts, or intended business areas. The server 102 is further programmed to determine a third set of timing constraints based on the evaluating, where the schedule for implementing the change request is further determined based on the third set of timing constraints.

In some embodiments, the server 102 is programmed to compute a first plurality of indicators of a current system performance in terms of resource utilization, aggregate service level, or infrastructural health. The server 102 is programmed to then calculate a second plurality of indicators of a risk level of the change request, including a number of covered features, an estimated number of source code pull requests within a certain amount of time, an estimated deployment rate, or an estimated number of emergencies in production within the certain amount of time. Furthermore, the server 102 is programmed to determine whether the change request is to be approved based on the first plurality of indicators and the second plurality of indicators.

In some embodiments, the server 102 is programmed to iteratively re-determine the schedule for implementing the change request and re-determine whether the change request is to be approved until it is determined that the one or more change requests scheduled for the current release are approved, before implementing the one or more change requests.

In step 402, the server 102 is programmed or configured to detect an issue in a production environment in which a plurality of features corresponding to a plurality of change requests are implemented.

In step 404, the server 102 is programmed or configured to determine one or more computer applications related to the issue.

In step 406, the server 102 is programmed or configured to create a log embedding for one or more logs of the one or more computer applications.

In step 408, the server 102 is programmed or configured to select one or more clusters from a plurality of clusters based on the log embedding. Each cluster of the plurality of clusters has one or more change embeddings respectively for one or more change requests of the plurality of change requests.

In some embodiments, the log embedding covers a specific period of time before the detecting is performed, and the one or more clusters includes a change embedding or an aggregate change embedding that is within a specific distance away from the log embedding. In certain embodiments, the change embedding for a particular change request in the plurality of clusters represents one or more attributes of the particular change request, including a change summary, a list of intended business areas, a list of applicable computing assets, a group of required computing resources, a set of affected user accounts, a collection of test cases, a forward implementation, or a rollback procedure.

In step 410, the server 102 is programmed or configured to identify a first set of change requests corresponding to the one or more clusters.

In step 412, the server 102 is programmed or configured to select a plurality of nodes from an asset graph based on the one or more computer applications. Each node in the asset graph represents a computer application and each edge in the asset graph represents a relationship between two computer applications. In some embodiments, the plurality of nodes includes a set of nodes representing the one or more computer applications and any node within a specific number of edges away from the set of nodes. In certain embodiments, the relationship represents that a first computer application calls a second computer application, is dependent on the second application, shares a library with the second computer application, or requires the output of the second computer application.

In step 414, the server 102 is programmed or configured to identify a second set of change requests that are associated with a group of computer applications represented by the plurality of nodes.

In step 416, the server 102 is programmed or configured to receive an evaluation for each change request of at least one change request in a combination of the first set of change requests and the second set of change requests. In some embodiments, the combination is a union of the first set of change requests and the second set of change requests or a subset of the union for which an aggregate distance is below a predetermine threshold.

In step 418, the server 102 is programmed or configured to implement a resolution of the issue in the production environment based on the at least one evaluation. In some embodiments, the resolution of the issue includes executing a rollback procedure of a particular change request of the at least one change request, suspending operation of a computing asset to which the particular change request applies, submitting a new change request, or resetting the production environment with a reboot.

5. EXAMPLE IMPLEMENTATION

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
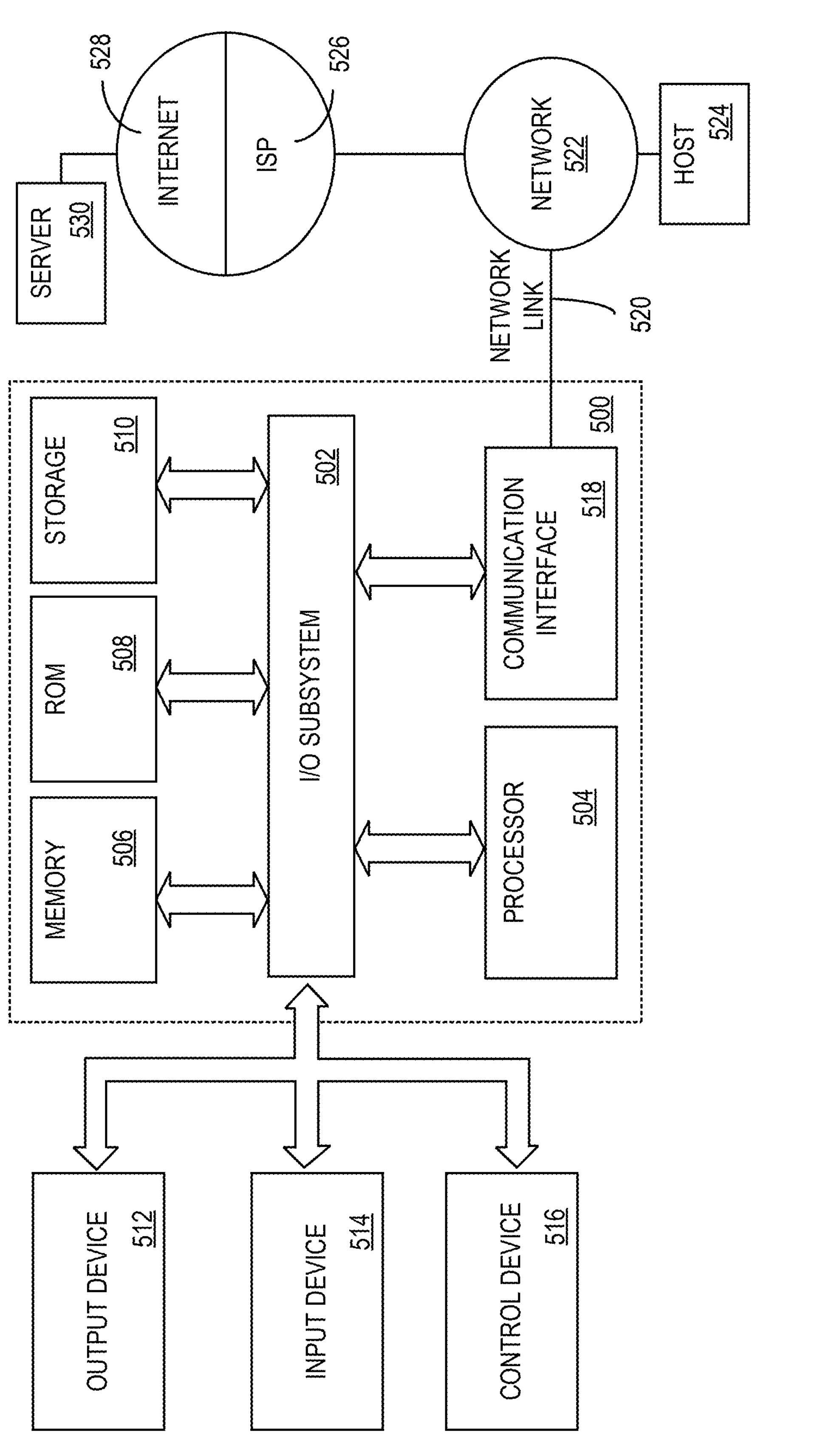
FIG. 5 illustrates an example computer system upon which various embodiments may be implemented.

FIG. 5 illustrates an example computer system upon which various embodiments may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or Advanced RISC Machines (ARM) processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as flash memory, or solid-state storage, magnetic disk, or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, XML, Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators, or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on the output device 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host computer 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to I/O subsystem 502. Communication interface 518 provides a two-way data communication coupling to network link(s) 520 that are directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a LAN, WAN, campus network, internetwork, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server 530 may be coupled to internet 528. Server 530 broadly represents any computer, data center, virtual machine, or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, Uniform Resource Locator (URL) strings with parameters in HTTP payloads, application programming interface (API) calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using SQL or NoSQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. EXTENSIONS AND ALTERNATIVES

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of managing development and performance in a computing environment, the computer-implemented method being performed by one or more processors and comprising:

detecting an issue in a production environment in which a plurality of features corresponding to a plurality of change requests are implemented;

determining one or more computer applications related to the issue;

creating a log embedding for one or more logs of the one or more computer applications;

selecting one or more clusters from a plurality of clusters based on the log embedding, each cluster of the plurality of clusters having one or more change embeddings respectively for one or more change requests of the plurality of change requests;

identifying a first set of change requests corresponding to the one or more clusters;

selecting a plurality of nodes from an asset graph based on the one or more computer applications, each node in the asset graph representing a computer application and each edge in the asset graph representing a relationship between two computer applications;

identifying a second set of change requests that are associated with a group of computer applications represented by the plurality of nodes;

receiving an evaluation for each change request of at least one change request in a combination of the first set of change requests and the second set of change requests;

implementing, by the one or more processors, a resolution of the issue in the production environment based on the at least one evaluation, the resolution of the issue including executing a rollback procedure of a particular change request of the at least one change request, suspending operation of a computing asset to which the particular change request applies, submitting a new change request, or resetting the production environment with a reboot.

2. The method of claim 1, further comprising:

receiving a change request;

creating a change embedding for the change request;

assigning the change embedding to a cluster of the plurality of clusters;

identifying a specific computer application associated with the change request;

determining a first set of timing constraints based on the cluster;

determining a second set of timing constraints based on a neighborhood of the node representing the specific computer application in the asset graph;

determining a schedule for implementing the change request using a large language model (LLM) based on the first set of timing constraints and the second set of timing constraints;

implementing one or more change requests scheduled for a current release in the production environment.

3. The method of claim 2, the first set of timing constraints including not scheduling more than a first number of change requests with embeddings that belong to the cluster for a common time period;

the second set of timing constraints including not scheduling more than a second number of change requests associated with computer applications represented by nodes in the neighborhood for the common time period.

4. The method of claim 2, further comprising:

evaluating one or more attributes of the change request, including expected resource utilization, affected user accounts, or intended business areas;

determining a third set of timing constraints based on the evaluating, the schedule for implementing the change request being further determined based on the third set of timing constraints.

5. The method of claim 2, further comprising:

computing a first plurality of indicators of a current system performance in terms of resource utilization, aggregate service level, or infrastructural health;

calculating a second plurality of indicators of a risk level of the change request, including a number of covered features, an estimated number of source code pull requests within a certain amount of time, an estimated deployment rate, or an estimated number of emergencies in production within the certain amount of time;

determining whether the change request is to be approved based on the first plurality of indicators and the second plurality of indicators.

6. The method of claim 5, further comprising iteratively re-determining the schedule for implementing the change request and re-determining whether the change request is to be approved until it is determined that the one or more change requests scheduled for the current release are approved, before implementing the one or more change requests.

7. The method of claim 1, the log embedding covering a specific period of time before the detecting is performed, the one or more clusters including a change embedding or an aggregate change embedding that is within a specific distance away from the log embedding.

8. The method of claim 1, the plurality of nodes including a set of nodes representing the one or more computer applications and any node within a specific number of edges away from the set of nodes.

9. The method of claim 1, the change embedding for a specific change request in the plurality of clusters representing one or more attributes of the specific change request, including a change summary, a list of intended business areas, a list of applicable computing assets, a group of required computing resources, a set of affected user accounts, a collection of test cases, a forward implementation, or a specific rollback procedure.

10. The method of claim 1, the combination being a union of the first set of change requests and the second set of change requests or a subset of the union for which an aggregate distance is below a predetermine threshold.

11. The method of claim 1, the relationship representing that a first computer application calls a second computer application, is dependent on the second computer application, shares a library with the second computer application, or requires output of the second computer application.

12. A non-transitory, computer-readable storage medium storing one or more sequences of instructions which when executed cause one or more processor to perform:

detecting an issue in a production environment in which a plurality of features corresponding to a plurality of change requests are implemented;

determining one or more computer applications related to the issue;

creating a log embedding for one or more logs of the one or more computer applications;

selecting one or more clusters from a plurality of clusters based on the log embedding, each cluster of the plurality of clusters having one or more change embeddings respectively for one or more change requests of the plurality of change requests;

identifying a first set of change requests corresponding to the one or more clusters;

selecting a plurality of nodes from an asset graph based on the one or more computer applications, each node in the asset graph representing a computer application and each edge in the asset graph representing a relationship between two computer applications;

identifying a second set of change requests that are associated with a group of computer applications represented by the plurality of nodes;

receiving an evaluation for each change request of at least one change request in a combination of the first set of change requests and the second set of change requests;

implementing, by the one or more processors, a resolution of the issue in the production environment based on the at least one evaluation, the resolution of the issue including executing a rollback procedure of a particular change request of the at least one change request, suspending operation of a computing asset to which the particular change request applies, submitting a new change request, or resetting the production environment with a reboot.

13. The non-transitory, computer-readable storage medium of claim 12, the one or more sequences of instructions when executed causing the one or more processor to further perform:

receiving a change request;

creating a change embedding for the change request;

assigning the change embedding to a cluster of the plurality of clusters;

identifying a specific computer application associated with the change request;

determining a first set of timing constraints based on the cluster;

determining a second set of timing constraints based on a neighborhood of the node representing the specific computer application in the asset graph;

determining a schedule for implementing the change request using a LLM based on the first set of timing constraints and the second set of timing constraints;

implementing one or more change requests scheduled for a current release in the production environment.

14. The non-transitory, computer-readable storage medium of claim 13, the one or more sequences of instructions when executed causing the one or more processor to further perform:

computing a first plurality of indicators of a current system performance in terms of resource utilization, aggregate service level, or infrastructural health;

calculating a second plurality of indicators of a risk level of the change request, including a number of covered features, an estimated number of source code pull requests within a certain amount of time, an estimated deployment rate, or an estimated number of emergencies in production within the certain amount of time;

determining whether the change request is to be approved based on the first plurality of indicators and the second plurality of indicators.

15. The non-transitory, computer-readable storage medium of claim 12, the log embedding covering a specific period of time before the detecting is performed, the one or more clusters including a change embedding or an aggregate change embedding that is within a specific distance away from the log embedding.

16. The non-transitory, computer-readable storage medium of claim 12, the plurality of nodes including a set of nodes representing the one or more computer applications and any node within a specific number of edges away from the set of nodes.

17. The non-transitory, computer-readable storage medium of claim 12, the change embedding for a specific change request in the plurality of clusters representing one or more attributes of the specific change request, including a change summary, a list of intended business areas, a list of applicable computing assets, a group of required computing resources, a set of affected user accounts, a collection of test cases, a forward implementation, or a specific rollback procedure.

18. The non-transitory, computer-readable storage medium of claim 12, the relationship representing that a first computer application calls a second computer application, is dependent on the second computer application, shares a library with the second computer application, or requires output of the second computer application.

19. A system for managing development and performance in a computing environment, comprising:

a memory;

one or more processors coupled to the memory and configured to perform:

detecting an issue in a production environment in which a plurality of features corresponding to a plurality of change requests are implemented;

determining one or more computer applications related to the issue;

creating a log embedding for one or more logs of the one or more computer applications;

selecting one or more clusters from a plurality of clusters based on the log embedding, each cluster of the plurality of clusters having one or more change embeddings respectively for one or more change requests of the plurality of change requests;

identifying a first set of change requests corresponding to the one or more clusters;

selecting a plurality of nodes from an asset graph based on the one or more computer applications, each node in the asset graph representing a computer application and each edge in the asset graph representing a relationship between two computer applications;

identifying a second set of change requests that are associated with a group of computer applications represented by the plurality of nodes;

receiving an evaluation for each change request of at least one change request in a combination of the first set of change requests and the second set of change requests;

implementing, by the one or more processors, a resolution of the issue in the production environment based on the at least one evaluation, the resolution of the issue including executing a rollback procedure of a particular change request of the at least one change request, suspending operation of a computing asset to which the particular change request applies, submitting a new change request, or resetting the production environment with a reboot.

* * * * *